G. D. PARKER.
FRUIT DRYING APPARATUS.
APPLICATION FILED NOV. 26, 1915.

1,194,538.

Patented Aug. 15, 1916.
2 SHEETS—SHEET 1.

WITNESS
W. F. Drew.

INVENTOR
George D. Parker
BY
Acker & Totten
ATTORNEYS

G. D. PARKER.
FRUIT DRYING APPARATUS.
APPLICATION FILED NOV. 26, 1915.

1,194,538.

Patented Aug. 15, 1916.
2 SHEETS—SHEET 2.

WITNESS
Wm. F. Drew.

INVENTOR
George D. Parker
BY
ATTORNEYS

UNITED STATES PATENT OFFICE.

GEORGE D. PARKER, OF RIVERSIDE, CALIFORNIA.

FRUIT-DRYING APPARATUS.

1,194,538.  Specification of Letters Patent.  Patented Aug. 15, 1916.

Application filed November 26, 1915. Serial No. 63,616.

*To all whom it may concern:*

Be it known that I, GEORGE D. PARKER, a citizen of the United States, residing at Riverside, in the county of Riverside and State of California, have invented certain new and useful Improvements in Fruit-Drying Apparatus, of which the following is a specification.

The present invention relates to driers and more particularly to an apparatus designed for removing the moisture from or for the drying of fruit, preferably oranges, and after the same have been washed and are discharged from the washing apparatus.

My invention consists broadly in providing a plurality of absorbent elements or layers of material and so arranging and operating the same that the fruit passes therebetween and across coacting elements in a zigzag path and from one element to another from the inlet of the apparatus toward the discharge end thereof.

The principal objects of my invention are to provide a drier wherein superimposed elements or belts of suitable material are provided and certain of the elements or belts of material are operated in a path across the path of movement of the coöperating elements or belts whereby the fruit is continuously rotated in a zigzag path over the elements or belts and in a direction toward the discharge end of the apparatus; to provide a structure wherein the water absorbed in the elements or belts is wrung or otherwise removed therefrom, and to provide a drier which occupies but little space and contains a greater area of absorbent surface for contact with the fruit than is present in driers of this type now employed; to provide a drier wherein certain of the absorbent elements or belts may be inclined to regulate the time of the travel of the fruit through the apparatus.

With the above mentioned and other objects in view the invention consists in the novel construction and combination of parts hereinafter described and illustrated in the accompanying drawings; it being understood that various changes in the form, proportion, size and minor details of construction may be resorted to without departing from the spirit or sacrificing any of the advantages of the invention.

To more fully comprehend the invention reference is directed to the accompanying drawings wherein—

Figure 1:
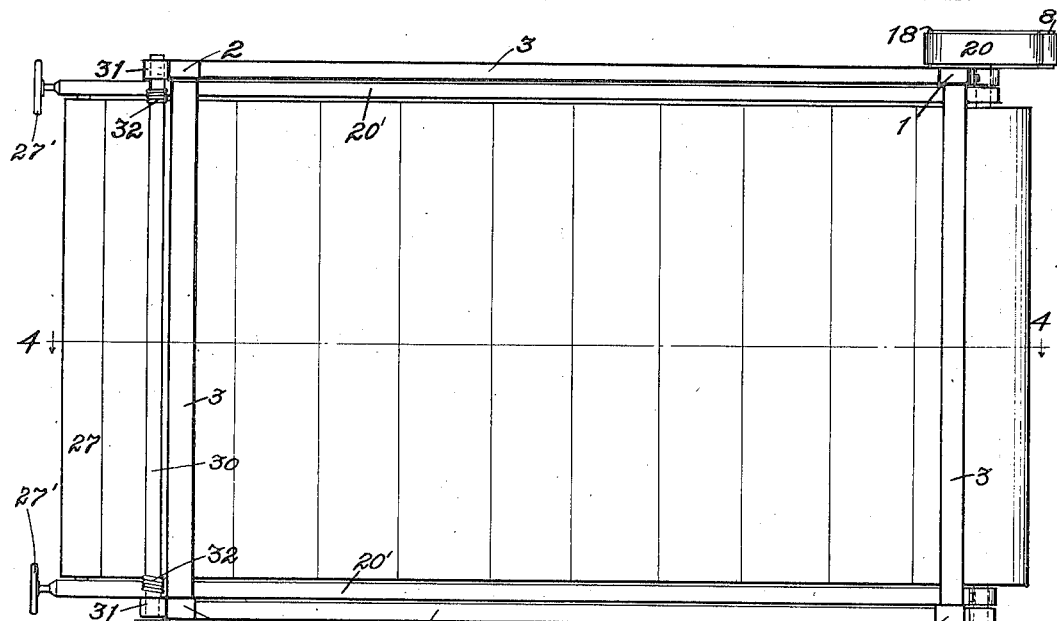
Figure 2:
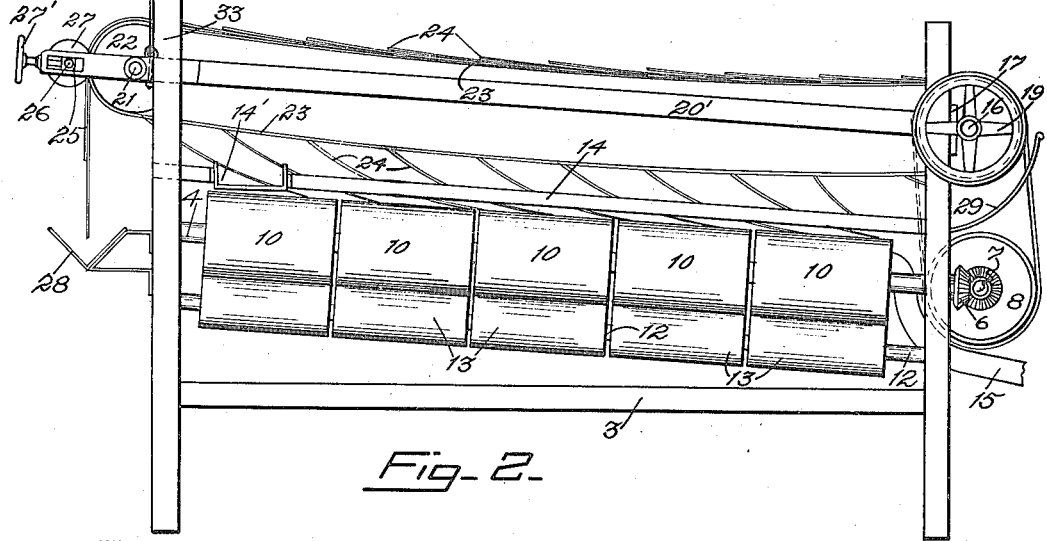
Figure 3:
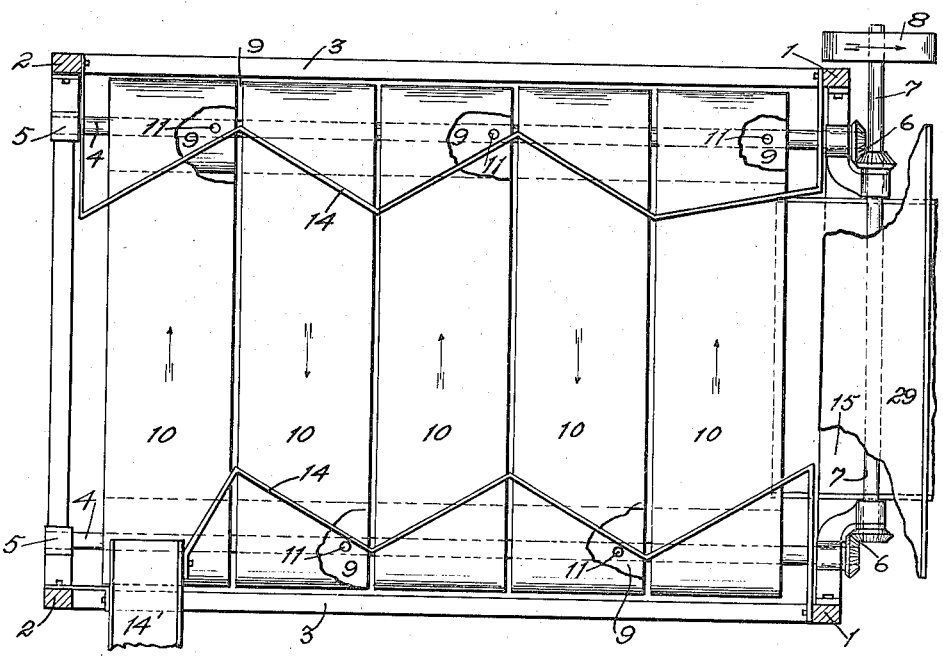
Figure 4:
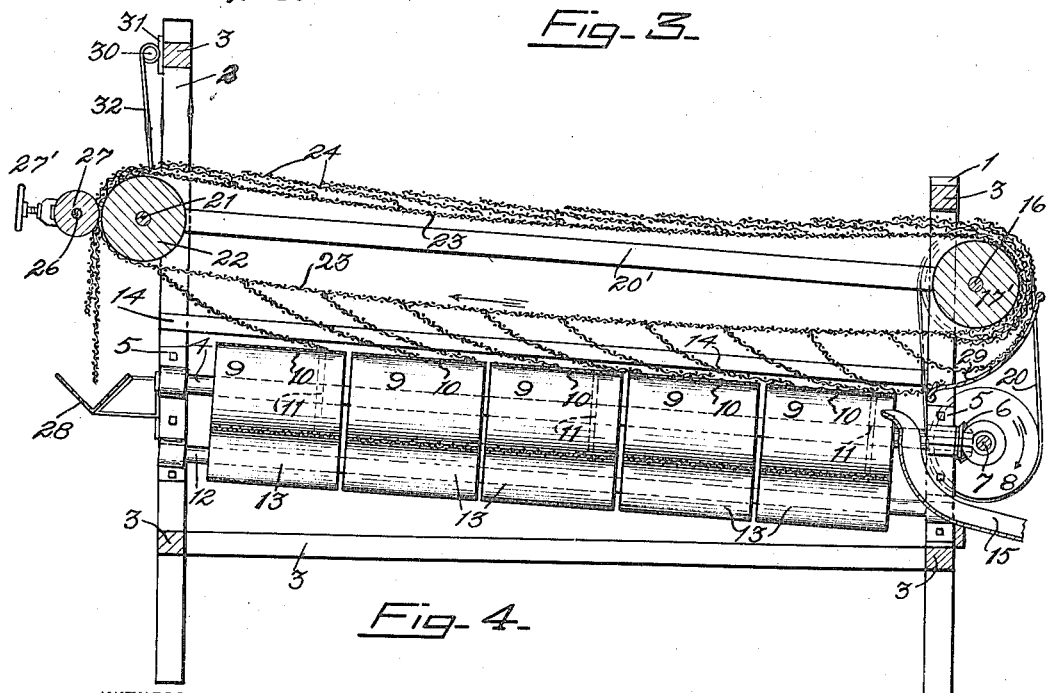

Figure 1 is a view in plan of an embodiment of my invention. Fig. 2 is a view in side elevation disclosing more fully the arrangement of the elements or belts of absorbent material, the operating means therefor and the wringers associated therewith. Fig. 3 is a sectional plan view disclosing the arrangement of the elements or belts of absorbent material on which the fruit is supported, the arrows indicating the direction of travel of the supporting elements. Fig. 4 is a longitudinal sectional view taken on line 4—4 of Fig. 1.

Referring more particularly to the drawings wherein like characters of reference designate corresponding parts 1 and 2 are the vertical corner members of a supporting frame connected together by the side frame members 3, the structure providing a substantially rectangular supporting frame as in the drawings.

Parallel spaced shafts 4, inclined toward one end of the frame are rotatably supported at their ends in bearings 5 carried by the corner members 1 and 2, said shafts are in geared relation at their ends as at 6 with a drive shaft 7 extending transversely of the frame and also rotatably mounted on bearings, and said last mentioned shaft is driven through the band wheel 8 to rotate the shafts 4 in opposite directions as in Fig. 3. The shafts 4 have mounted thereon in slight spaced relation the supporting drums 9 disposed oppositely to each other on their respective shafts and over each pair of which operates a conveyer belt 10 extending transversely of the frame and said belts being preferably formed of suitable absorbent material. To insure the travel of adjacent conveyer belts in opposite directions transversely of the frame, alternate drums 9 on their respective shafts are pinned or keyed to rotate with their shafts as at 11, and the drum of each pair opposite to the one that is keyed or pinned to the shaft is free to rotate about its supporting shaft.

Beneath one shaft 4 and extending parallel thereto is mounted a suitable shaft 12 which carries the freely rotatable wringer rolls 13 one positioned beneath each drum 9 on the shaft above the same, and between which and the respective drums 9 the absorbent material 10 is passed to wring or remove the water or moisture from the same.

Suitable zigzag sides or guiding frames 14 prevent the carrying of the fruit off of the ends of the belts 10 and also direct the fruit as it rolls by gravity from the feed to the discharge end of the apparatus onto the next belt in the direction of its travel. The frames 14 are preferably supported at their ends by the corner posts and extend a slight distance above the conveyer belts directly over the drums 9. Interposed between the ends of one of the frames 14 and the corner posts adjacent the highest belt is a chute or feed trough 14' through which the fruit to be dried is fed onto the highest end of the conveyer. The dried fruit is received from the side edges of the lowermost belt into a trough 15 and is conveyed to any suitable place of deposit.

Extending transversely of the lower or discharge end of the frame and connecting the supporting posts 2 is a shaft 16 rotatably mounted at its ends in bearings 17 carried by the posts, and said shafts between the bearings carries a drum 17' and on its opposite ends carries belt pulleys 18 and 19. The pulley 18 is connected through a belt 20 with the band wheel 8 and the pulley 19 receives power from any suitable source.

Fulcrumed on the shaft 16 are the side members 20' of a suitable auxiliary frame which is coextensive with the main frame. A shaft 21 extends transversely of the free end of the auxiliary frame and is rotatably mounted in bearings carried thereby. A drum 22 rotates with and is carried by said shaft 21 and over the same and the drum 17' operates a suitable belt 23 preferably of absorbent material and on the outer surface of which is secured the transversely extending tabs or wipers 24 which are of sufficient length to permit the free ends thereof to contact with the absorbent belt 10 when the belt 23 is drawn thereover. Rotatably mounted in adjustable bearings 25 at the free end of the auxiliary frame is a shaft 26 carrying a wringer roll 27 between which and the drum 22 the belt 23 and wipers 24 are caused to pass and the pressure of the wringer roll against the drum 22 wrings the moisture from the belt 23 and wipers 24. The adjustable members 27' coact with the bearings 25 to regulate the adjustment or tension of the wringer roll relative to the drum 22.

The moisture or water wrung from the belt 23 and wipers 24 is received in a suitable trough and is conveyed to any suitable place of deposit. A guard 29 receives the tabs or wipers 24 as the free ends of the same drop from the belt 23 as the same passes over the roller or drum 17' at the discharge end of the machine and prevents the sudden contact of the wipers or slapping thereof against the fruit about to be discharged from the drier.

To regulate or elevate the free end of the auxiliary frame relative to the transversely extending supporting belts 10 I provide a shaft 30 rotatably mounted in bearings 31 carried by the upper end of the corner posts adjacent the feed end of the drier, and said shaft when rotated is adapted to wind the flexible supporting members 32 secured at their lower ends to the eyes 33 carried by the free end of the frame. An operating handle 34 is mounted on the shaft 30 and said shaft also carries a ratchet 35 for coöperating with a pawl 36, carried by one of the corner posts and which maintains the frame in its adjusted position.

By my improved construction the fruit to be dried is supplied from the trough 14' and passes from the end thereof onto the belt 10' in front of the chute and is carried thereby transversely of the apparatus until by gravity it rolls from the first belt 10' onto the one below which carries it in an opposite direction. While the fruit is being carried transversely of the drier and is rolling by gravity from one belt to another the free ends of the absorbent wipers 24 traveling in the direction of the arrows Fig. 4, are contacting with the upper surface thereof to remove the moisture therefrom and said wipers or tabs 24 retard the rolling of the fruit toward the discharge end of the apparatus. The moisture absorbed by the belts 10' and the tabs or wipers 24 is wrung or removed therefrom so that dry surfaces of the belts are presented to the fruit as it passes between the same toward the discharge end of the apparatus. The variation of inclination of the auxiliary frame regulates the overlap of the tabs or wipers 24 on the belts 10' and therefore controls the speed of the travel of the fruit through the drier.

Having thus described my invention what I claim is—

1. A fruit drying apparatus comprising superimposed coacting belts between which the fruit to be dried passes, certain of the belts providing a support for the fruit, means for operating the superimposed belts to cause the fruit to travel in a path transversely thereof to present all surfaces of the fruit to the belts for the removal of the moisture therefrom.

2. A fruit drying apparatus comprising fruit supporting and moisture absorbing elements arranged in superimposed relation between and in contact with which the fruit to be dried passes, said elements being correspondingly inclined to permit the fruit being dried to roll by gravity relatively thereto, and means for moving one of said elements.

3. A fruit drying apparatus comprising a supporting frame, a plurality of endless belts lying adjacent to each other and providing a fruit supporting surface, a superimposed endless absorbent belt for movement over said first mentioned belts in contact therewith, and means for operating said belts to cause the fruit passing therebetween to travel in a zigzag path across the same.

4. A fruit drying apparatus comprising a supporting frame, a plurality of endless belts lying adjacent to each other and providing a fruit supporting surface, means for operating adjacent belts in opposite directions, a superimposed endless belt for movement over said first mentioned belts and in contact therewith, and means for operating said superimposed belts in a direction transversely to the path of movement of the first mentioned belts.

5. A fruit drying apparatus comprising a supporting frame, a plurality of endless belts lying adjacent to each other and providing a fruit supporting surface said belts being transversely inclined to permit the fruit to be dried to roll from one to another, a superimposed endless belt for movement over said first mentioned belts and in contact therewith and means for operating said belts to cause the fruit to travel in a zigzag path across the same.

6. A fruit drying apparatus comprising a supporting frame, a plurality of endless belts lying adjacent to each other and providing a fruit supporting surface, a superimposed endless belt for movement over the said first mentioned belts in contact therewith, means for operating said belts to cause the fruit to travel therebetween in a zigzag path across the same, and means for removing the moisture from the belts.

7. A fruit drying apparatus comprising a supporting frame, a plurality of endless belts lying adjacent to each other and providing a fruit supporting surface, said belts being inclined transversely to cause the fruit to roll from one to another, means carried by the frame and extending transversely of the belts for preventing the fruit from rolling over the ends thereof, a superimposed endless belt for movement over said first mentioned belts in contact therewith, and means for operating said belts to cause the fruit to travel therebetween in a zigzag path across the same.

8. A fruit drying apparatus comprising a supporting frame, a plurality of endless belts lying adjacent to each other and providing a fruit supporting surface, a superimposed endless belt for movement over said first mentioned belts, a plurality of absorbent wipers or tabs carried by said superimposed belt for contacting with the fruit on said first mentioned belts, means for operating said belts to cause the fruit to travel therebetween in a zigzag path across the same, and means for removing the moisture from the belts.

9. A fruit drying apparatus comprising a supporting frame, a plurality of endless belts lying adjacent to each other and providing a fruit supporting surface, said belts inclined transversely to permit the fruit to roll from one to another, a superimposed endless belt for movement over said first mentioned belts, a plurality of tabs or wipers of absorbent material carried by said superimposed belt for contacting with the fruit in said first mentioned belts, means for operating adjacent first mentioned belts in opposite directions, means for operating said superimposed belt in a direction across the path of travel of said first mentioned belts, and means for removing the moisture therefrom.

10. A fruit drying apparatus comprising a movable element providing a fruit supporting surface and inclined transversely of its direction of travel to permit the fruit to be dried to roll by gravity across the same, an absorbent element above said first mentioned element and between which and the first mentioned element the fruit to be dried passes, and means for moving the absorbent element in a direction across the path of travel of the first mentioned element.

11. A fruit drying apparatus comprising a movable element providing a fruit supporting surface, an absorbent element above said first mentioned element and between which and the first mentioned element the fruit to be dried passes, and means for moving the absorbent element in a direction across the path of travel of the first mentioned element.

12. A fruit drying apparatus comprising a movable element providing a fruit supporting surface, an absorbent element above said first mentioned element and between which and the first mentioned element the fruit to be dried passes, means for moving the absorbent element in a direction across the path of travel of the first mentioned element, and means for wringing the moisture from the elements.

13. A fruit drying apparatus comprising a movable element providing a fruit supporting surface, an absorbent element above said first mentioned element, between which and the first mentioned element the fruit to be dried passes, means for preventing the fruit from rolling from the end of the first mentioned element, and means for moving the absorbent element in a direction across the path of travel of the first mentioned element.

14. A fruit drying apparatus comprising a plurality of movable elements arranged adjacent to each other and providing a fruit supporting surface, an absorbent element above said first mentioned elements and between which and the first mentioned elements the fruit to be dried passes, and means for moving the absorbent element in a direction across the path of travel of the first mentioned elements.

15. A fruit drying apparatus comprising a plurality of movable elements adjacent to each other and providing a fruit supporting surface and transversely of which the fruit rolls from the feed to the discharge end of the apparatus, an absorbent element above the first mentioned elements, and between which and the first mentioned elements the fruit to be dried passes, and means for moving the absorbent element in a direction across the path of travel of the first mentioned elements.

16. A fruit drying apparatus comprising a plurality of movable elements arranged adjacent to each other and providing a fruit supporting surface and transversely of which the fruit rolls from the feed to the discharge end of the apparatus, means for operating adjacent elements in opposite directions, an absorbent element above the said first mentioned elements and between which and the first mentioned elements the fruit to be dried passes, and means for moving the absorbent element in a direction across the path of travel of the first mentioned elements.

17. A fruit drying apparatus comprising a plurality of movable elements arranged adjacent to each other and providing a fruit supporting surface, said elements inclined transversely to permit the fruit to roll transversely thereof from the feed to the discharge end of the drier, an absorbent element above the said first mentioned elements and between which and the first mentioned elements the fruit to be dried passes, and means for moving the absorbent element in a direction across the path of travel of the first mentioned elements.

18. A fruit drying apparatus comprising a plurality of movable elements arranged adjacent to each other and providing a fruit supporting surface, an absorbent element inclined transversely to permit the fruit to roll transversely thereof from the feed to the discharge end of the apparatus, an absorbent element above said first mentioned elements and between which and the first mentioned elements the fruit to be dried passes, and means for moving the absorbent element from the discharge end toward the feed end of said apparatus and in a direction across the path of travel of the first mentioned elements.

19. A fruit drying apparatus comprising a plurality of movable elements arranged adjacent to each other and providing a fruit supporting surface, means for operating adjacent elements in opposite directions, said elements being inclined transversely to permit the fruit to roll transversely thereof from the feed to the discharge end of said drier, means for preventing the fruit from rolling from the ends of the said elements, an absorbent element above the first mentioned elements and between which and the first mentioned elements the fruit to be dried passes, and means for moving the absorbent element from the discharge end toward the feed end of said apparatus and in a direction across the path of travel of said first mentioned elements.

20. A fruit drying apparatus comprising an inclined moisture absorbing element for contacting with and relatively to which the fruit to be dried rolls by gravity, and means for causing the rolling fruit to travel in a path crosswise relative to the moisture absorbing element.

21. A fruit drying apparatus comprising opposing members arranged in spaced superimposed relation and one of said members having moisture absorbing properties, and means for causing fruit to roll between said members in a to and fro course.

In testimony whereof I have signed my name to this specification in the presence of two subscribing witnesses.

GEORGE D. PARKER.

Witnesses:
HARRY F. TOTTEN,
N. A. ACKER.